United States Patent [19]

Neill

[11] 4,216,849

[45] Aug. 12, 1980

[54] ELECTROMAGNETS FOR BRAKES AND CLUTCHES

[75] Inventor: Daniel L. Neill, Belleville, Mich.

[73] Assignee: Kelsey Hayes Co., Romulus, Mich.

[21] Appl. No.: 914,474

[22] Filed: Jun. 12, 1978

[51] Int. Cl.³ .............................................. B60T 7/12
[52] U.S. Cl. .................................. 188/138; 188/163; 192/35; 192/84 T; 335/281
[58] Field of Search ..................... 188/137, 138, 163; 192/84 T, 35, 36; 335/269, 272, 281, 286, 287, 299; 310/77

[56] References Cited

U.S. PATENT DOCUMENTS

| 4,004,262 | 1/1977 | Grove | 188/138 X |
| 4,172,242 | 10/1979 | Myers et al. | 188/138 |

Primary Examiner—George E. A. Halvosa
Attorney, Agent, or Firm—Ralph J. Skinkiss

[57] ABSTRACT

An electromagnet for brakes and clutches having outer and inner poles and an electrical coil for creating a magnetic field between these poles is provided having a circumferential gap in the forward portion of the outer pole. The gap reduces the flux density over the forward portion of the magnet face while increasing the flux density over the rearward portion. The variable flux density over the magnet face thus establishes an unbalance of forces attracting the magnet toward the armature plate causing the magnet to engage the armature plate heel first thereby eliminating "squeal" caused by magnet gouging and two plane wear of the magnet's friction face.

14 Claims, 9 Drawing Figures

PRIOR ART ELECTROMAGNET

ELECTROMAGNETS FOR BRAKES AND CLUTCHES

BACKGROUND OF THE INVENTION

My invention relates to an electromagnetic friction apparatus and, more particularly, to an improved electromagnet for use in such apparatus.

Known electromagnet braking systems utilize an electromagnet affixed to a movable lever arm which actuates the brake mechanism, upon energizing of the electromagnet. When energized, the electromagnet slidingly engages a rotating armature plate, rotating with and coupled to the wheel to be braked. The rotating armature plate, consequently, drags the electromagnet in the direction of its rotation, causing pivotal movement of the lever arm which, in turn, actuates the brake mechanism.

The commonly used, flat faced, central core type electromagnets of the prior art, for example, as described in U.S. Pat. Nos. 2,304,118; 3,753,182; 3,756,355; and 3,757,264; when in sliding engagement with the rotating armature plate exhibit what is referred to as "squeal". Electromagnet squeal is believed to result from an audible vibration created by the electromagnet's leading edge gouging, or digging into, the armature plate surface, particularly upon initial electromagnet—armature plate engagement. Such gouging, or digging, of the armature plate is thought to result from the tilting moments imposed upon the magnet about the point of attachment of the electromagnet to the lever arm.

In addition to causing an undesirable squeal, the electromagnet tilting moments also cause the magnet leading edge to wear at a higher rate than that of the trailing portion of the magnet. As the leading edge wears, it forms a new tapered friction face extending from the leading edge to the point of magnet attachment to the lever arm. Because of this two plane wear the trailing half of the magnet will no longer engage the armature plate, resulting in loss of braking effectiveness.

SUMMARY OF THE INVENTION

I have found that the magnet flux density profile diametrically across the face of a flat faced central core electromagnet of the prior art may be advantageously varied, whereby, the leading edge gouging of the armature plate may be substantially reduced, or eliminated. Thus, two plane wear of the magnet's frictional face and the undesirable squeal is eliminated.

The flux density of a typical prior art flat faced central core electromagnet may be varied by placement of a circumferential slot, or groove, in the forward portion of the magnet's outer pole. The presence of such a slot or groove, effectively reduces the flux between the inner and outer pole over the forward portion, and increases the flux density over the rear portion of the magnet's frictional face. Thus, upon excitation, the rear of the electromagnet has a greater magnet attraction to the armature plate than the forward portion. Hence, the magnet engages the armature plate heel first and during sliding contact, therewith, does not tend to gouge the armature plate because of the unbalance of forces.

By placement of the circumferential slot or groove in the magnet's outer pole the continuity of the magnet's outer pole frictional surface remains undisturbed. This feature is particularly advantageous as it is desirable to have full metal to metal contact between the magnet outer pole and brake armature plate to frictionally drag the magnet in the direction of wheel rotation thereby actuating the brake mechanism.

PREFERRED EMBODIMENT OF THE INVENTION

Figure 1:
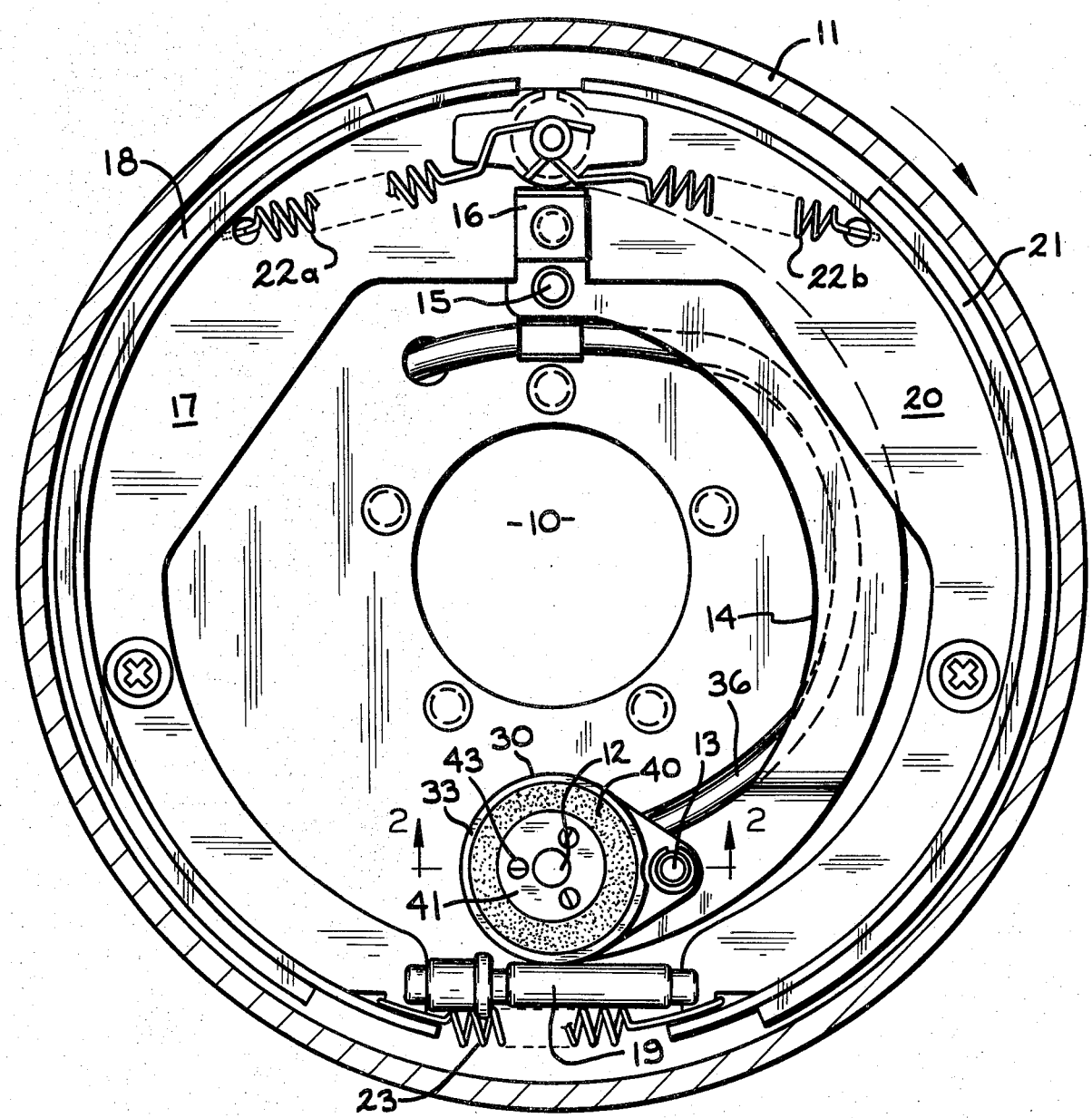
FIG. 1 presents a cross-section taken radially through a vehicle wheel showing a typical electric brake assembly as mounted on the vehicle's right side.
Figure 2:
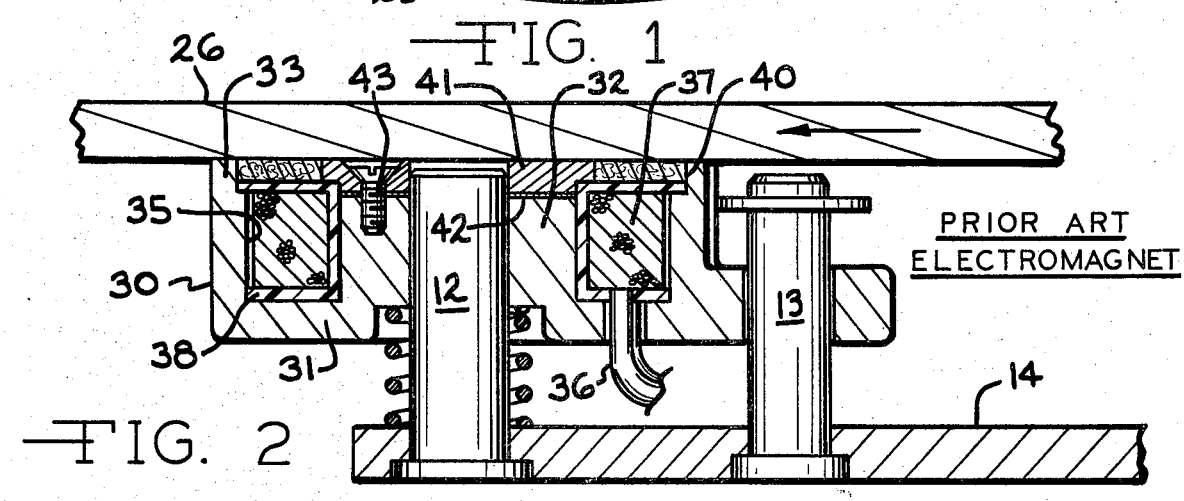
FIG. 2 is a cross-section taken along line 2—2 of FIG. 1 showing a typical electromagnet structure of the prior art.

FIGS. 1 and 2 show a typical electric brake system employing an electromagnet of the prior art. FIG. 1 illustrates a brake system 10 typically mounted on the right side of the braked vehicle. Brake drum 11 rotates in the clockwise direction, as indicated by the arrow, during forward travel of the vehicle. To apply the brakes, electromagnet 30 is energized, causing sliding frictional engagement with armature plate 26 (FIG. 2) which, coupled to brake drum 11, also rotates in the clockwise direction. Electromagnet 30 attached to actuating lever arm 14 by reaction pin 12 and anti rotation pin 13, is frictionally dragged along with the rotating armature plate 26 causing lever arm 14 to pivot about pivot pin 15. Swivel block 16 mounted on a vertically extending arm of lever 14 rotates clockwise about pivot pin 15, forcing primary shoe 20, with friction pad 21 attached thereto, to frictionally engage drum 11. Primary shoe 20 is further dragged by drum 11 forcing secondary shoe 17 having friction pad 18 thereon, to also engage drum 11 through adjusting screw 19. Thus, the primary and secondary shoes become frictionally engaged with the rotating drum, braking the vehicle wheel attached thereto. Upon de-energizing of electromagnet 30, shoe return springs 22a and 22b, in concert with shoe connecting spring 23, return primary shoe 20, secondary shoe 17, and actuating lever arm 14 to their original non-engaged positions.

FIG. 2 illustrates a typical prior art flat faced, central core electromagnet 30 utilized in electric brake systems.

Electromagnet 30 basically comprises a ferrous metal housing 31 formed so as to provide an inner pole 32 and an annular outer pole 33 having an annular recession 35 therebetween. Located within annular recess 35 is a coil assembly comprising lead wire assembly 36 and wire windings 37 wrapped within insulating bobbin 38. Positioned atop the coil assembly is a friction material washer 40, for frictionally engaging armature plate 26, force fitted about ferrous metal attachment plate 41. Attachment plate 41 is secured to the inner pole 32 by means of screws 43. A non-ferrous shim 42 may be positioned between attachment plate 41 and inner pole 32 to reduce magnet residual force when the electric current is removed.

Figure 3:
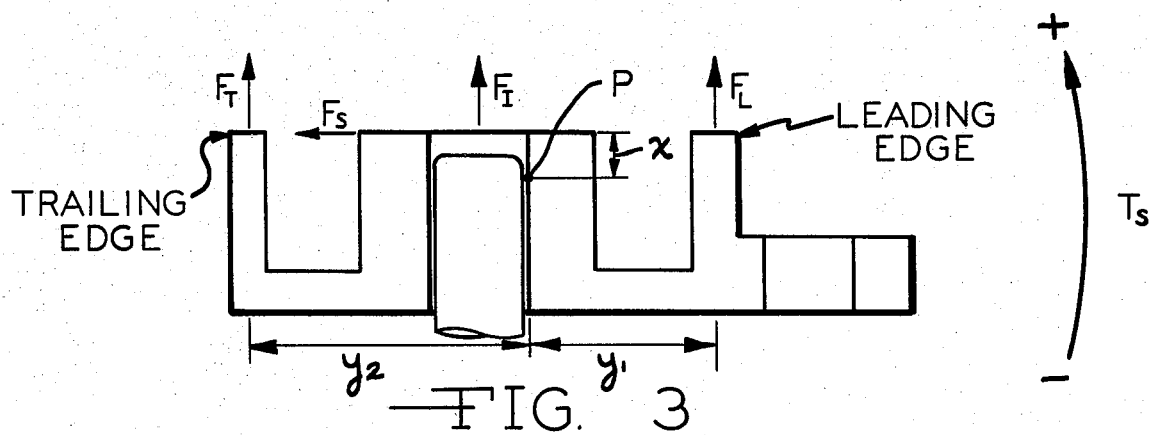
FIG. 3 presents a schematic free body diagram for a typical electromagnet showing the forces acting thereon during sliding engagement of the electromagnet with the armature plate.

Now, referring to FIG. 3, the forces acting upon the electromagnet during sliding engagement with the armature plate, create a moment $T_S$ which causes the magnet leading edge to gouge, or dig, into the advancing armature plate material. This gouging is believed to cause an audible frequency, or squeal, in addition to causing unwanted two plane wear of the electromagnet friction face.

Moment $T_S$ may be expressed as:

$$T_S = F_L y_1 + F_S x - F_T y_2$$

where:
$T_S$ = Effective torque, producing squeal at the magnet leading edge, as measured about point P.
$F_L$ = Magnetic attractive force at the leading edge outer pole
$F_S$ = Frictional sliding force between magnet face and armature plate
$F_T$ = Magnetic attractive force at the trailing edge outer pole
$F_I$ = Magnetic attractive force at the inner pole
$x$ = Moment arm of $F_S$
$y_1$ = Moment arm of $F_L$
$y_2$ = Moment arm of $F_T$ For prior art magnets, $F_L y_1$ is approximately equal to $F_T y_2$, such that $T_S$ approximately equals $F_S x$ because $y_2 - y_1$ is relatively small. Thus, magnets of the prior art, when energized and in sliding contact with the rotating armature plate, exhibit a positive tipping moment directly proportional to the frictional force $F_S$ between the magnet and armature plate causing the electromagnet to gouge the armature plate. The larger $F_S$ becomes, the greater the gouging.

It becomes apparent that to prevent magnet gouging, the value of $T_S$ should be zero or of a negative value.

Figure 4:
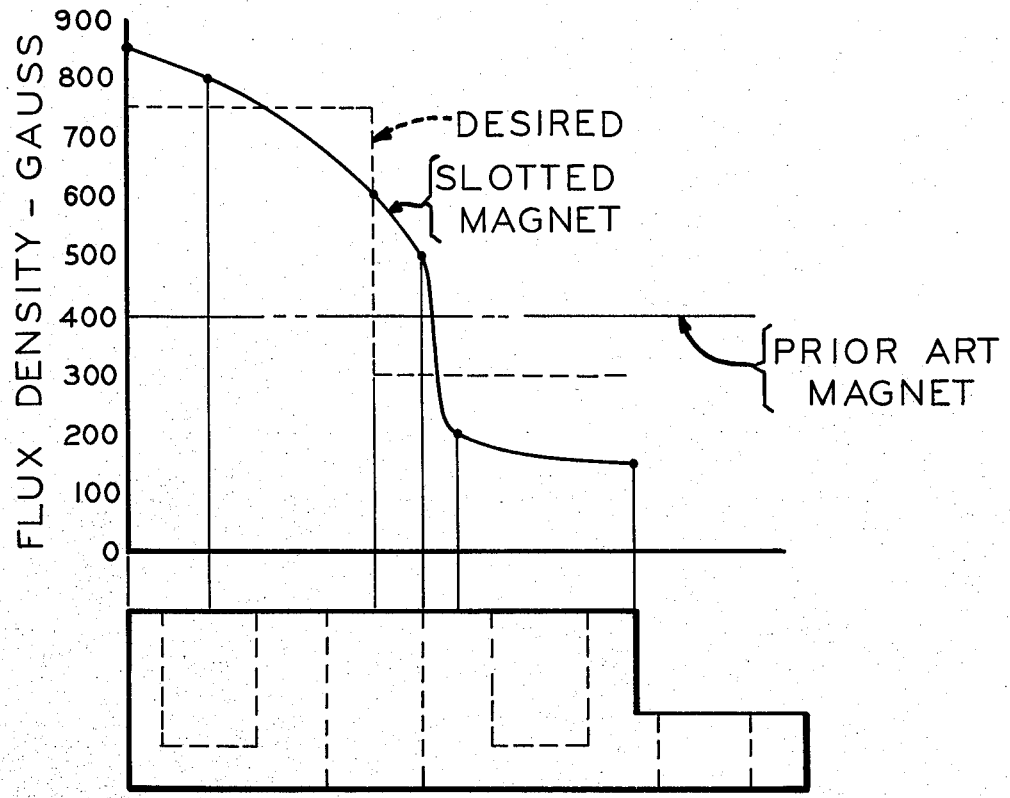
FIG. 4 presents a plot of magnetic flux distribution for electromagnets of the prior art and that of my improved electromagnet.

FIG. 4 presents a plot of magnetic flux density diametrically across the contact face of a typical prior art electromagnet as shown. A typical flat faced central core magnet of the prior art, produces an approximate constant 400 gauss at two amps, a plot of which is identified in FIG. 4 as "prior art magnet". A preferred flux density distribution in accord with the above moment equation is also shown in FIG. 4 and identified as "desired". As shown, it is preferable to have a flux density profile across the magnet face such that the value of $F_L$ is significantly lower than that of $F_T$. If a magnet exhibited approximately 700-800 gauss across the trailing half and approximately 200-400 gauss across the leading half, the magnet upon excitation would engage the armature plate heel first, thus, preventing any initial tendency to gouge. Further, during sliding engagement, gouging would not exist because of the unequal values of $F_T$ and $F_L$.

I have discovered an electromagnet construction that is characterized by having a flux distribution, as shown in FIG. 4 and identified as "slotted magnet". My slotted magnet exhibits the desired high flux density across the trailing half and a relatively low flux density across the leading half of the magnet face.

Figure 6A:
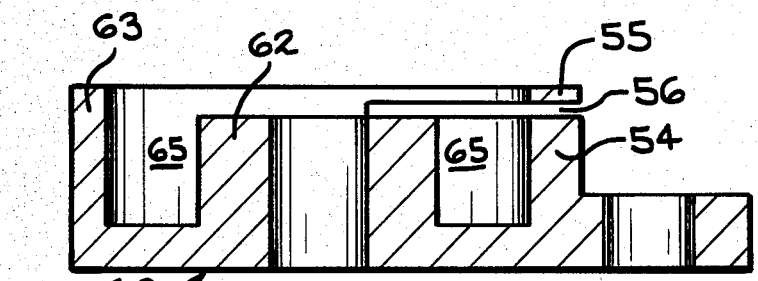
FIGS. 5, 6 and 6A illustrate an electromagnet embodying the principles of my invention.
Figure 5:
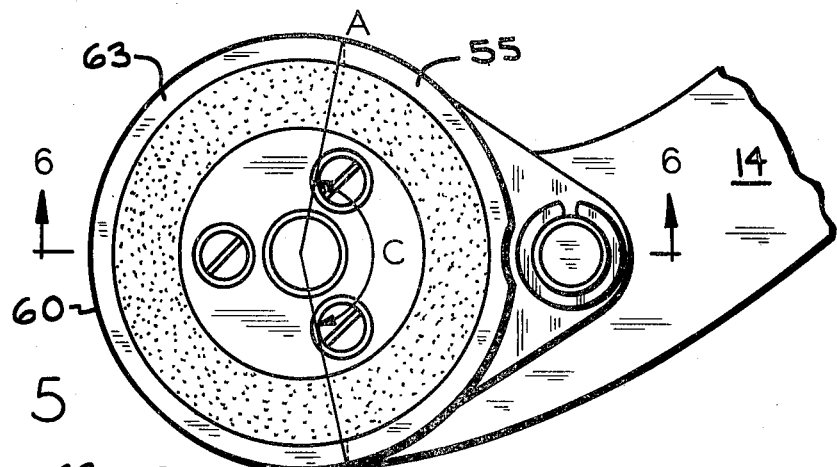
Figure 6:
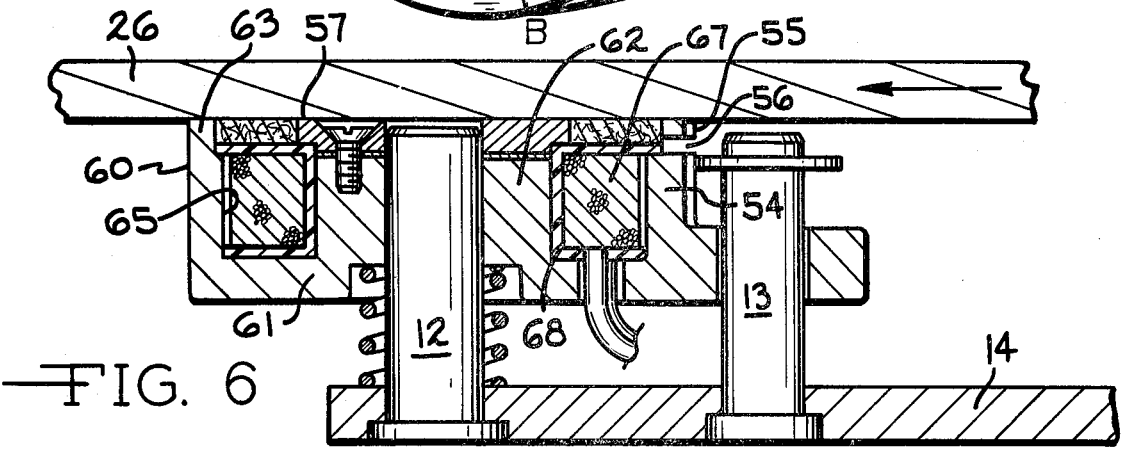

FIGS. 5, 6 and 6A illustrate the preferred embodiment of my slotted magnet 60. My slotted magnet construction is similar to that of the prior art magnet in that housing 61 basically comprises an inner pole 62 and an annular outer pole 63 having an annular recess 65 therebetween to receive bobbin 68 containing windings 67.

However my slotted magnet 60, differs from the prior art electromagnet construction of FIG. 2 principally in the structure of housing 61 forward of reaction pin 12.

The forward portion of the annular outer pole 63, from point A circumferentially to point B contains a horizontal slot extending through the outer pole and paralleling the magnet's frictional face 57, thereby, separating the upper cantilever portion 55 of the outer pole from the lower portion 54 by a slot or gap 56.

The presence of gap 56 substantially reduces the magnetic flux between inner pole 62 and the forward portion 55 of the outer pole. Further, the flux between inner pole 62 and the rear portion of outer pole 63 is significantly increased. The resulting flux density profile at 2 amps for an electromagnet having a 2½" face diameter and a 0.045 to 0.050 inch slot positioned approximately 0.125 inches below frictional face 57, extending throughout included angle C=170° is shown in FIG. 4. Angle C may be varied to obtain variations in the flux density profile.

Because of the presence of gap 56, the forward cantilever portion 55 of outer pole 63 is structurally weakened. Therefore, I have found it preferable to provide structural support for the cantilever portion 55 by placing an arcuate or other conveniently configured non ferrous shim within slot 56 and securing it therein by any suitable adhesive material.

For further clarification, FIG. 6A presents a cross-section of magnet housing 60, also taken along line 6—6 of FIG. 5, absent other magnet and brake elements.

Figure 7:
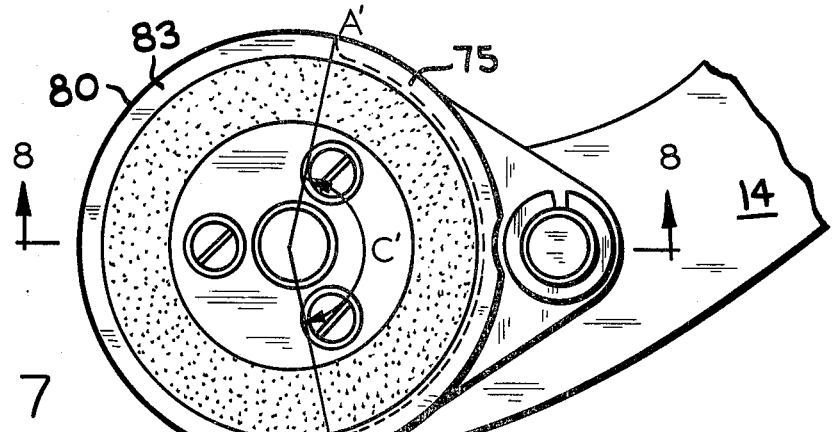
FIGS. 7 and 8 illustrate an electromagnet comprising an alternate embodiment of my invention.
Figure 8:
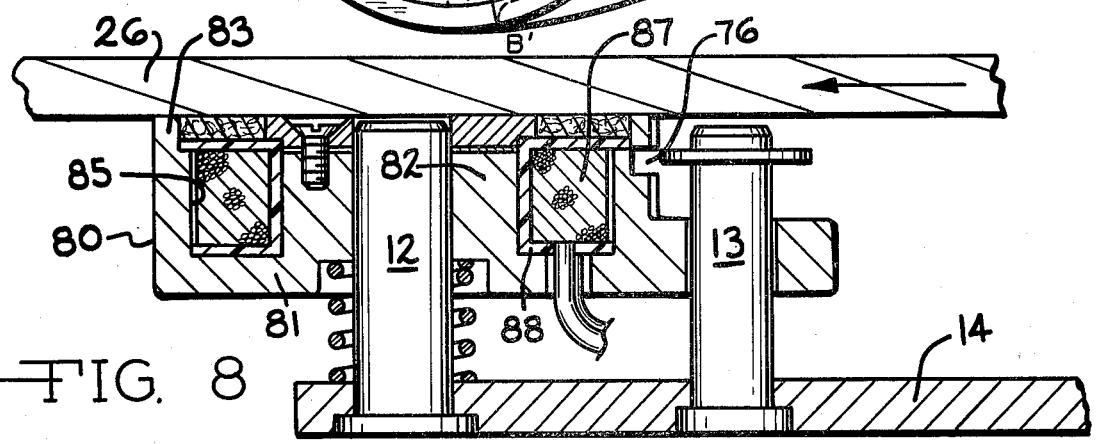

FIGS. 7 and 8 illustrate an alternate embodiment of my invention. Again, electromagnet 80 is similar in construction to electromagnets of the prior art, in that electromagnet 80 comprises a ferrous metal housing 81 having an inner pole 82, annular outer pole 83 and an annular recess 85 therebetween, wherein, bobbin 88 is positioned containing wire windings 87. The forward portion 75 of annular outer pole 83 has an annular groove 76 extending circumferentially through the arc C' from A' to B'. Groove 76 may be in the external or outer surface of the forward portion 75 of outer pole 83, as shown, or alternately may be cut into the inside surface of the outer pole. The later configuration would eliminate the accumulation dirt within the groove. Angle C' may be any value less than or equal to 180°.

The presence of groove 76 in the forward portion of the outer pole acts similarly to the slot of the embodiment shown in FIGS. 5 and 6. The magnetic flux between the inner pole 82 and the forward portion 75 of outer pole 83 is similarly reduced and the flux between the inner pole and rear portion of the outer pole increased. However, the groove exhibits a lessor effect than the slotted embodiment.

It is readily apparent that by my above described invention the frictional surface of the magnet's outer pole remains intact and undisturbed. Therefore, the maximum frictional drag between magnet and armature plate is assured through the full metal to metal contact therebetween.

I claim:

1. In an electric brake system having an armature rotating relative to an electromagnet whereby said brake system is actuated by magnetic engagement between the electromagnet and said armature, an improved electromagnet comprising an electrical coil for magnetically energizing the electromagnet, a first pole enclosed within said coil, a second pole circumscribing said coil, said second pole having a continuous planer armature engaging surface, an aperture opening in said second pole spaced away from said armature engaging surface whereby said continuous planer surface fully engages said armature plate thereby causing frictional drag therebetween and effecting actuation of the brake mechanism.

2. The electromagnet, as claimed in claim 1, wherein said aperture opening circumscribes a portion of said coil.

3. An electromagnet for use in electric brakes, clutches and the like having an armature rotating relative to said electromagnet whereby said brake, clutch or the like is actuated by magnetic engagement between the electromagnet and said armature, said electromagnet comprising a base, two poles protruding from said base, magnetically energizing means for establishing a magnetic field between said poles, said poles forming co-planer surfaces for frictional engagement with said armature, one of said poles having an aperture opening spaced between said poles' frictional surface and said base and positioned such that said frictional surface is unbroken by said aperture opening.

4. In an electric brake system having an armature rotating relative to an electromagnet, whereby said brake system is actuated by magnetic engagement between the electromagnet and said armature, an improved electromagnet comprising, a body having a first pole circumscribed by a second pole, said first and second poles defining a cavity therebetween, each of said poles having a continuous planer surface co-planer with the other for engaging said armature, an electric coil within said cavity for magnetizing said poles, said second pole having an aperature opening partially circumscribing said electric coil and spaced away from said second poles' continuous planer surface whereby said continuous planer surface completely engages said rotating armature causing frictional drag therebetween and effecting actuation of the brake system.

5. The electromagnet of claim 4 wherein said aperture opening comprises a slot peripherally equidistant from said second poles co-planner surface.

6. In a system for electrically actuating brakes having lever arm means movably secured to a fixed back up plate and adapted to move brake means into contact with a rotatable brake drum responsive to movement of said lever arm means, an armature plate secured to said brake drum, an electromagnet secured to said arm means at a position proximate to said armature plate for engaging the armature plate upon energizing the electromagnet thereby effecting movement of said lever arm means, the improvement comprising an electromagnet having a ferrous body, said body comprising a base, an inner pole and an outer pole extending from said base, said outer pole circumscribing said inner pole forming an annular cavity therebetween, said outer pole having a continuous planer surface whereby said continuous planer surface fully engages said armature plate thereby causing frictional drag therebetween and effecting actuation of the brake mechanism, said outer pole having a peripheral interstice between said base and said continuous planer surface.

7. The electromagnet of claim 6, wherein said interstice comprises an aperture opening.

8. The electromagnet as claimed in claim 6, wherein said interstice comprises a gap extending partially through the outer pole.

9. The improvement as claimed in claim 6 wherein said interstice comprises a slot partially circumscribing said inner pole.

10. The improvement as claimed in claim 6 wherein said interstice parallels said outer pole's planner surface.

11. In a system for electrically actuating brakes having lever arm means movably secured to a fixed back up plate and adapted to move brake means into contact with a rotatable brake drum responsive to movement of said lever arm means, an armature plate secured to said brake drum, an electromagnet secured to said lever arm means at a position proximate to said armature plate for engaging the armature plate upon energizing the electromagnet thereby effecting movement of said lever arm means, said electromagnet having a body defining a first pole circumscribed by a second pole, said first and second poles defining a cavity therebetween and having co-planer surfaces for engaging said armature plate, an electric coil within said cavity for magnetizing said poles, the improvement comprising a peripheral groove in said second pole spaced away from said armature engaging surface of said second pole such that said surface is unbroken by said groove.

12. The improvement as claimed in claim 11 wherein said groove partially circumscribes said first pole.

13. The improvement as claimed in claim 11 wherein said groove parallels said second pole's co-planner surface.

14. The improvement as claimed in claim 11 wherein nonmagnetic friction material is disposed within the cavity formed between said first and second poles providing a frictional surface for engagement with said armature.

* * * * *